Dec. 18, 1928.  1,696,054

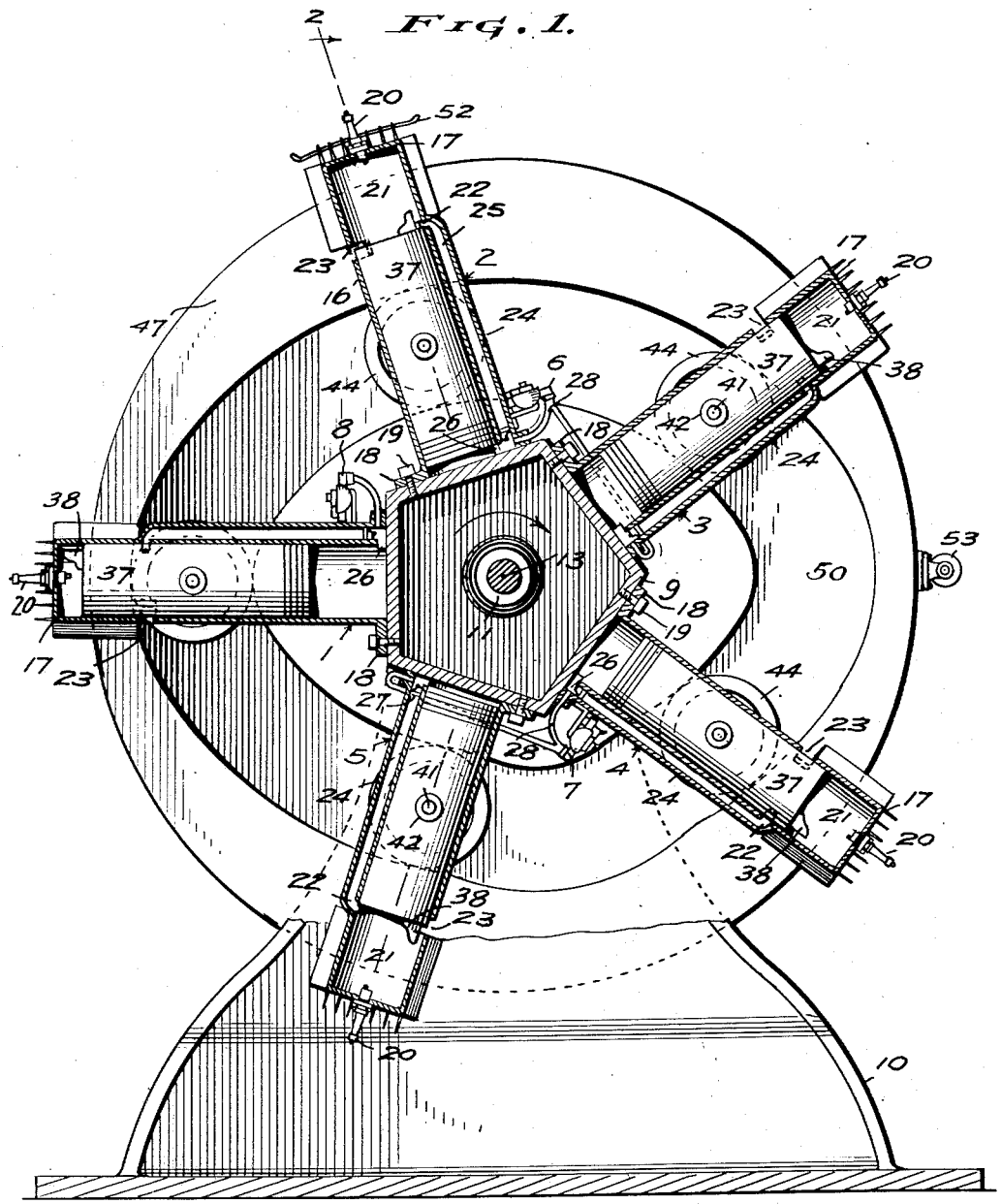

H. A. PALMER

INTERNAL COMBUSTION ENGINE

Filed Feb. 11, 1927  3 Sheets-Sheet 2

INVENTOR.
Harry A. Palmer
BY
Geo. F. Kimmel ATTORNEY.

Dec. 18, 1928.

H. A. PALMER 1,696,054

INTERNAL COMBUSTION ENGINE

Filed Feb. 11, 1927   3 Sheets-Sheet 3

INVENTOR.
Harry A. Palmer
BY
Geo. F. Kimmel, ATTORNEY.

Patented Dec. 18, 1928.

1,696,054

UNITED STATES PATENT OFFICE.

HARRY A. PALMER, OF DORCHESTER, MASSACHUSETTS, ASSIGNOR TO PALMER INVENTIONS, INC., OF BOSTON, MASSACHUSETTS, A CORPORATION OF MASSACHUSETTS.

INTERNAL-COMBUSTION ENGINE.

Application filed February 11, 1927. Serial No. 167,503.

This invention relates to internal combustion engines, and has for its object to provide, in a manner as hereinafter set forth, an engine of such type whereby the piston thereof is balanced during its reciprocations and the power therefrom transferred for driving purposes without the employment of connecting rods, as is now generally the case when driving a power transmitting shaft.

A further object of the invention is to provide, in a manner as hereinafter set forth, a stationary internal combustion engine for obtaining maximum efficiency with as few working parts as possible.

A further object of the invention is to provide, in a manner as hereinafter set forth, an internal combustion engine whereby continuous power is had by obtaining a low speed drive from a high speed piston displacement.

A further object of the invention is to provide, in a manner as hereinafter set forth, an internal combustion engine including means whereby a complete scavenging of the spent gases is had from the engine cylinder thereof under such conditions as tend to increase the efficiency of the engine.

A further object of the invention is to provide, in a manner as hereinafter set forth, an internal combustion engine including a rotor and cylinders and pistons cooperating therewith whereby said rotor and cylinders are so constructed that a plurality of impulses will be had from the motor on one revolution of the rotor.

A further object of the invention is to provide an internal combustion engine including a revoluble driven element operated without the employment of connecting rods.

Further objects of the invention are to provide an internal combustion engine, in a manner as hereinafter set forth, which is simple in its construction and arrangement, strong, durable, balanced, thoroughly efficient in its use, readily assembled, and comparatively inexpensive to set up.

With the foregoing and other objects in view the invention consists of the novel construction, combination and arrangement of parts, as hereinafter more specifically described, and illustrated in the accompanying drawings, wherein is shown an embodiment of the invention.

In the drawings wherein like reference characters denote corresponding parts throughout the several views:

Figure 1 is a sectional elevation of an internal combustion engine in accordance with this invention and of the type including a bank of radial cylinders.

Figure 3:
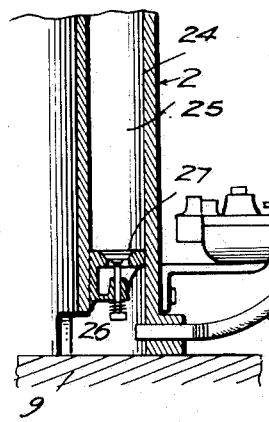
Figure 3 is a fragmentary view, in vertical section, of one of the cylinders.
Figure 2:
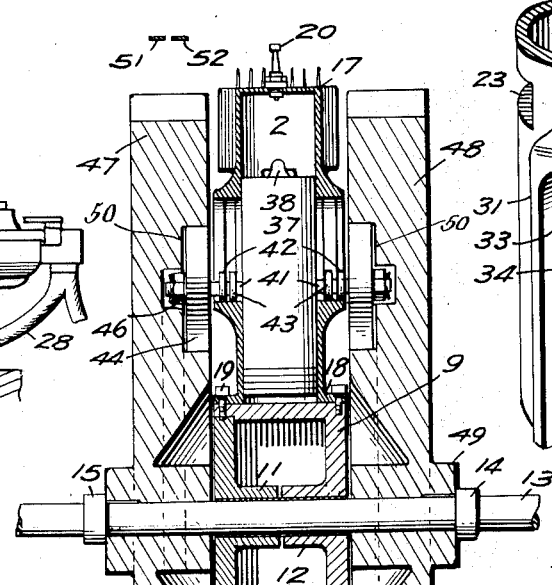
Figure 2 is a section on line 2—2 Figure 1.
Figure 5:
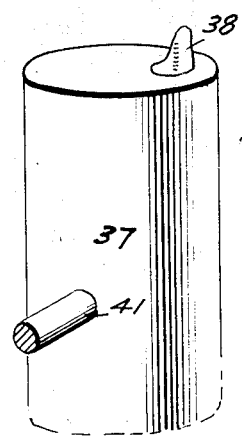
Figure 5 is a fragmentary view in perspective of a cylinder and the piston operating therein and with the said cylinder and piston disassembled.

The cylinders, forming elements of the engine, can be arranged in the form of a radial bank, or horizontally disposed bank, or a V-bank, and any number of cylinders can be employed. Preferably the engine is set up in a radial bank with five cylinders or in a horizontal bank with four cylinders. Each cylinder is stationary and a piston cooperates therewith. Each piston is closed at each end, and is hollow. Each cylinder is formed with an intake and an outlet port. The intake extends circumferentially of the cylinder and is comparatively narrow. The outlet is much wider than the intake and the function therefor will be hereinafter referred to.

With reference to Figure 1 to 5, the engine is illustrated as including five radially disposed cylinders referred to generally by the reference characters 1, 2, 3, 4 and 5 and which are equally spaced with respect to each other. As each cylinder is of the same construction, but one will be described, as the description of one will apply to the others. Common to the cylinders 2 and 3 is a carburetor 6. Common to the cylinders 4 and 5 is a carburetor 7 and associated with the cylinder 1 is a carburetor 8. If the radial bank consisted of six cylinders then a carburetor would be common to each pair of cylinders.

The cylinders are fixedly secured at their inner ends to a polygonal shaped stationary casing 9 mounted upon an upstanding supporting structure 10. The casing 9 is formed with a pair of bearings 11, 12, which are arranged within the casing 9 and are integral with the side walls thereof. The bearings 11, 12 extend towards each other and are provided for a power transmitting shaft 13, which extends through the casing 9 and projects a substantial distance from each side thereof. The shaft 13 carries a pair of spaced collars 14, 15.

Each cylinder 16 has its head 17 and its inner end open. The cylinder 16 is formed at its inner end with a laterally extending annular flange 18, through which extends holdfast devices 19 for fixedly securing the cylinder to one of the walls of the stationary casing 9. Such wall of the casing closes the inner end of the cylinder 16. A sparking plug 20 is mounted in the head 17. The combustion chamber formed by the cylinder is indicated at 21. The body of the cylinder 16 is formed with an intake 22 and an exhaust port 23. The intake 22 extends circumferentially of the cylinder and is comparatively narrow. The intake is also bridged. The exhaust port 23 is of greater area than the intake. Formed integral with the periphery of the cylinder 16 is an offset 24 which extends from a point forwardly of and in close proximity to the intake 22 and terminates in the flange 18. The offset 24 is formed in a manner to provide in connection with the cylinder 16 a by-pass 25 which leads from the inner end of the cylinder 16 to the intake 22. The cylinder 16 at its inner end is formed with an opening 26 which establishes communication between the cylinder 16 and the by-pass 25. The by-pass 25 at its inner end communicates, through the opening 26 with the interior of the cylinder 16 rearwardly of the inner end of the piston which operates in the cylinder. The intake for the combustible charge, which leads from the carburetor extends through the flange 18 and opens into the inner end of the by-pass 25 rearwardly of a check valve 27 arranged within the by-pass 25 at a point removed from its inner end. The intake pipe for the combustible charge and which leads from a carburetor is generally referred to by the reference character 28.

The cylinder 16, rearwardly of the combustion chamber 21, is formed with a pair of diametrically opposed. lengthwise extending slots 29, and surrounding each slot 29, as well as being spaced therefrom, is a rectangular guide 30, having its side walls indicated at 31, 32. The outer portion of the side wall 31, which is indicated at 33 is of greater thickness than the inner portion thereof indicated at 34. The outer portion of the wall 32, which is indicated at 35, is of less thickness, than the inner portion thereof indicated at 36. The thick part 36 of the wall 32 opposes the thin part 34 of the wall 31 and the thicker part 33 of the latter, opposes the thin part 35 of the wall 32. The inner face of the thickest part of the walls 31, 32 form bearing surfaces for a purpose to be presently referred to. The guide 30 is of greater width than the width of the slot 29. The function of the guides 30 will be presently referred to.

Figure 4:
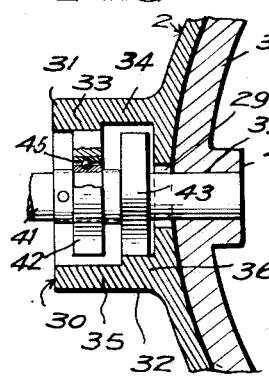
Figure 4 is a fragmentary view, in sectional plan illustrating a cylinder and the piston operating therein.

Operating within the cylinder 16, is a hollow piston 37 which is closed at each end, and has its forward end provided with a deflector 38. The piston 37 is of a length approximately equal to two-thirds of the length of the cylinder 16. The deflector 38 is positioned on the forward end of the piston 37 in a manner to oppose the intake 22 when the piston reaches the limit of its driving stroke. The deflector 38 is furthermore so positioned that it will be arranged in close proximity to the intake 22 when the piston 37 is at the limit of its driving stroke. The deflector 38 constitutes means for deflecting the in-coming charge and preventing it from ad-mixing with any of the spent gases. The piston 37 is formed at its transverse median with a pair of diametrically opposed openings 39, and each of which is surrounded by a collar or boss formed on the inner face of the piston. Secured in each opening 39 and a boss 40 is a laterally extending shaft 41 of a length to project an appropriate distance outwardly from a guide 30. The shaft 41 extends through the slot 29 and is of less diameter than the width of such slot. Revolubly mounted on the shaft 41 is a pair of spaced anti-friction guide rollers 42, 43 and each of which includes a bearing of the roller or ball type, and as illustrated in Figure 4 of the ball type. The guide rollers 42, 43 are of the same diameter and the roller 42 travels against the bearing surface formed by the inner face of the thickest part 33 of the wall 31 and the guide roller 43 travels against the bearings formed by the inner face of the thickest part 36 of the side wall 32. This manner of setting up the guide rollers 42, 43 with respect to a guide 30 prevents any possibility of wabbling or displacement of the piston 37 during its reciprocation.

Mounted on the outer end of the shaft 41 is a driving roller 44, of materially greater diameter than either one of the guide rollers and which is also set up with a roller or ball bearing and further is revoluble on the shaft 41. The bearing for the roller 44 is indicated at 45. The shaft 41 projects outwardly from the roller 44 and a securing means for the roller 44 is indicated at 46.

Keyed to the shaft 13 is a pair of revoluble rotors or rotators 47, 48 and each of which is of circular contour and provides a positive motion rotating element. The rotors are provided with hubs 49 and against the outer end of each hub abuts a collar 14 or 15. The inner face of each rotor is formed with a rotator groove 50 of a somewhat elliptical contour whereby the walls thereof will be formed with high and low parts. The rotors 47 and 48 are oppositely disposed with respect to each other. Operating in the cam grooves of the rotors 47, 48 for the purpose of revolving the rotors, are the drive rollers 44 carried by the shafts 41 which project from the pistons. The shape of the groove 50 of one rotor corresponds to the shape of the groove in the other rotor and the shape of each is such, as to provide two impulses to the rotors during each revolution thereof. The construction of the grooves 50 further provide for the operating of the cylinders in sequence. The construction and arrangement of the rotors and cylinders with respect to each other will provide for the balancing of the pistons of the motor. Associated with each sparking plug circuit is a pair of spaced contacts 51, 52, engaged by a circuit opening and closing element 53 carried by one of the rotors. The said element 53 is common to the several pairs of contacts and successively wipes the pairs to bridge the space between the contacts of a pair for closing that sparking circuit with which the pair of contacts is associated, and such circuit is closed at the end of the compression stroke of a piston.

The intake 22 extends circumferentially of the cylinder 16 and is comparatively narrow and acts to hold the pressure of the incoming charge travelling through the bypass until the exhaust of spent gases is completed. The pressure of the in-coming charge will completely scavenge the cylinder. The exhaust port 23 is of greater area than the intake to permit of the expansion of gases from the combusted charge to allow for the major portion thereof to exhaust before the intake opens, and the remaining portion thereof is removed by the pressure of the in-coming charge. By the foregoing arrangement, the cylinder is completely cleaned of spent gases.

An engine constructed in a manner as stated embodies as few working parts as possible and obtains maximum efficiency and provides for a drive without the employment of connecting rods. The construction provides for continuous power by obtaining a low speed drive from a high speed piston displacement. Approximately three and one half inch leverage is obtained on the drive shaft on the explosion with only about three quarters of an inch piston displacement in cylinder and therefore this results in a slow speed drive with a high speed piston displacement.

Figure 6:
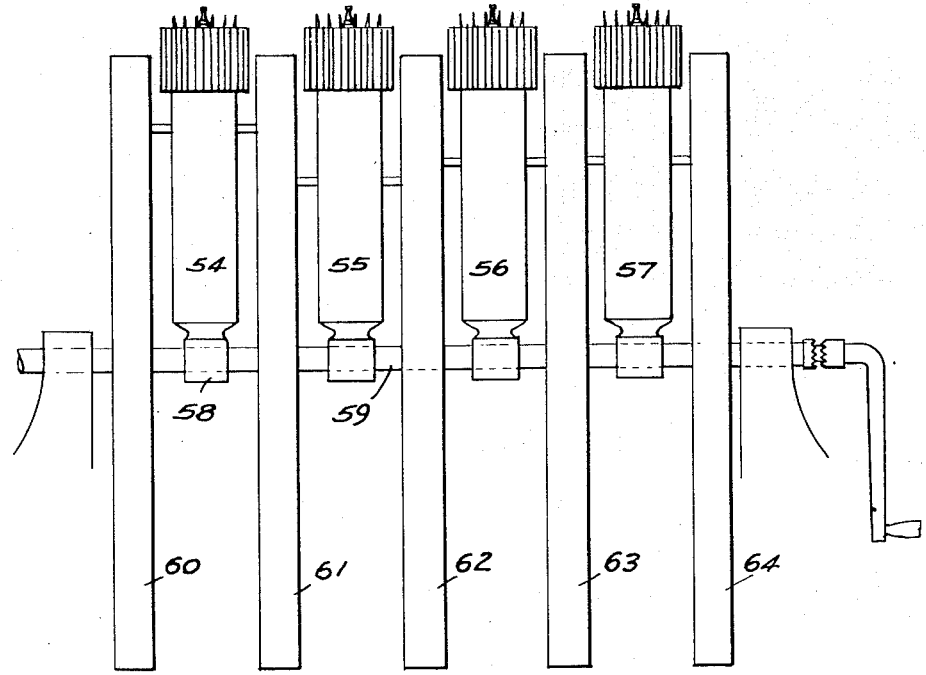
Figure 6 is a diagrammatical view of an internal combustion engine in accordance with this invention and set up with a horizontally disposed bank of cylinders.

With reference to the form shown in Figure 6 the pistons are constructed in the same manner as that referred to, but the cylinders are arranged in a horizontal bank. The bank of cylinders is illustrated by way of example as four in number, but it is obvious that this number can be increased. The cylinders are indicated at 54, 55, 56 and 57 and each has its lower end constructed to provide a bearing 58, for the power transmitting shaft 59. The cylinders are stationary and held in such position. Any suitable means can be employed for such purpose. Fixed to the shaft 59 and revolving the latter are rotors 60, 61, 62, 63 and 64. The rotor 61 is common to the pistons operating in the cylinders 54, 55. The rotor 62 is common to the pistons operating in the cylinders 55, 56 and the rotor 63 is common to the pistons operating in the cylinders 56, 57. The rotor 60 associates with the piston operating in the cylinder 54 and the rotor 64 associates with the piston operating in the cylinder 57.

Figure 7:
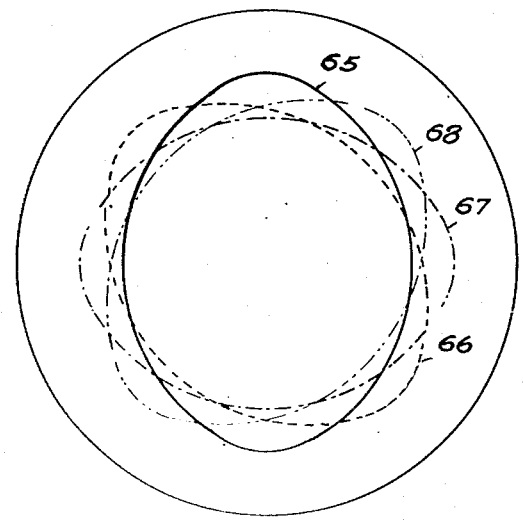
Figure 7 is a diagrammatical view illustrating the arrangement of the cam grooves in the rotors employed in the form shown in Figure 6.

With reference to Figure 7, the groove in the rotor 60 and in that face of the rotor 61 which opposes the inner face of the rotor 60 is as indicated at 65 in Figure 7. The groove on the face of the rotor 61 which opposes one of the faces of the rotor 61 is indicated at 66 and that face of the rotor 62 which opposes the rotor 61 is formed with a groove corresponding to that indicated at 66. The opposed faces of the rotors 62, 63 are provided with grooves corresponding to that as indicated at 67 in Figure 7 and the opposed faces of the rotors 63, 64 are provided with grooves, corresponding to that indicated at 68, Figure 7. Otherwise than that as stated the construction and arrangement of the parts of the engine illustrated diagrammatically in Figure 6, would be the same as that shown with respect to the engine illustrated in Figures 1 to 5.

The construction and arrangement of parts provides an internal combustion engine whereby the pistons thereof will be balanced during their reciprocations and have their power transferred for driving purposes without the employment of connecting rods, as is now generally the case when driving a power transmitting shaft, and under such conditions an engine is constructed with as few working parts as possible and obtains maximum efficiency, then furthermore as before stated the construction and arrangement provides for continuous power by a low speed drive from a high speed piston displacement.

The diameter of the driving rollers with respect to the width and length of the grooves controls the speed of the rotor.

It is thought the many advantages of a stationary internal combustion engine, in accordance with this invention, can be readily understood, and although the preferred embodiment of the invention is as illustrated and described, yet it is to be understood that changes in the details of construction can be had which will fall within the scope of the invention as claimed.

What I claim is:

1. In an internal combustion engine, a stationary cylinder, a piston operating therein, a rotor opposing the cylinder, means bodily carried by the piston, extending through and projecting laterally from the cylinder and traveling against the rotor for operating it, said means including anti-friction rollers adjacent its outer ends, and guiding means integral with said cylinder and including bearing surfaces for said rollers.

2. In an internal combustion engine, a stationary cylinder, a piston operating therein, a rotor opposing the cylinder, means bodily carried by the piston, extending through and projecting laterally from the cylinder and traveling against the rotor for operating it, said means including anti-friction rollers adjacent its outer end, guiding means integral with said cylinder and including bearing surfaces for said rollers, said bearing surfaces being offset relatively to each other.

3. In an internal combustion engine a stationary cylinder, a piston operating therein, a pair of rotors opposing said cylinder, means bodily carried by the piston, extending through and projecting laterally from both sides of the cylinder and traveling against said rotors for operating them simultanenously, said means including anti-friction rollers positioned inwardly with respect to the ends thereof, and guiding means integral with each side of said cylinder and including bearing surfaces for said rollers.

4. In an internal combustion engine a stationary cylinder, a piston operating therein, a pair of rotors opposing said cylinder, means bodily carried by the piston, extending through and projecting laterally from both sides of the cylinder and traveling against said rotors for operating them simultaneously, said means including anti-friction rollers positioned inwardly with respect to the ends thereof, guiding means integral with each side of said cylinder and including bearing surfaces for said rollers, and said bearing surfaces being offset relatively to each other.

5. In an internal combustion engine, a stationary cylinder, a guide projecting from each side thereof, a piston operating in said cylinder, a pair of rotors opposing said guides, means bodily carried by the piston, extending through the sides of the cylinder and through said guides and having the ends thereof provided with rotatable elements traveling against said rotors for operating them, said guides formed with offset bearing surfaces, said means including anti-friction rollers inwardly of the ends thereof, said rollers traveling against said bearing surfaces.

In testimony whereof, I affix my signature hereto.

HARRY A. PALMER.